Dec. 20, 1966  W. J. LARSON ET AL  3,292,351
LAWN MOWER HEIGHT ADJUSTING APPARATUS
Filed Oct. 14, 1964  3 Sheets-Sheet 1

INVENTORS
Walter J. Larson,
Harold D. Cook
BY
ATTORNEY

Dec. 20, 1966  W. J. LARSON ET AL  3,292,351
LAWN MOWER HEIGHT ADJUSTING APPARATUS
Filed Oct. 14, 1964  3 Sheets-Sheet 2
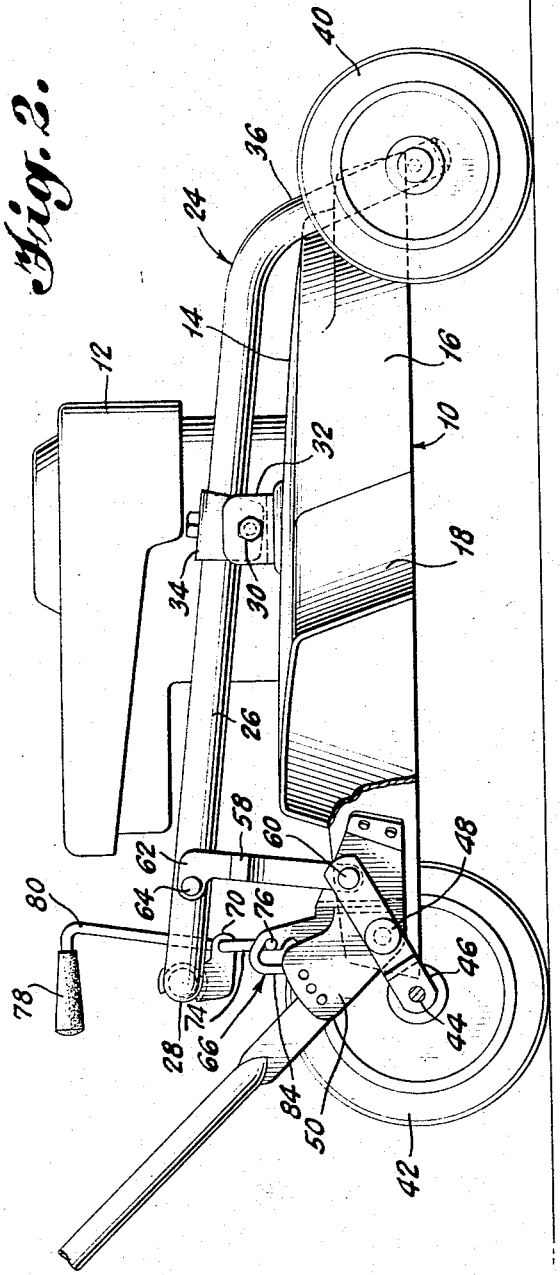
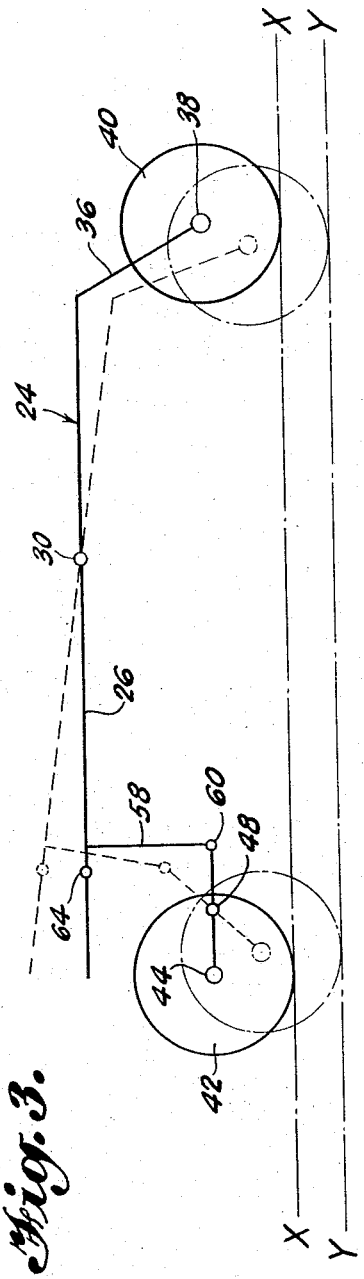
INVENTORS
Walter J. Larson,
Harold D. Cook
BY
ATTORNEY

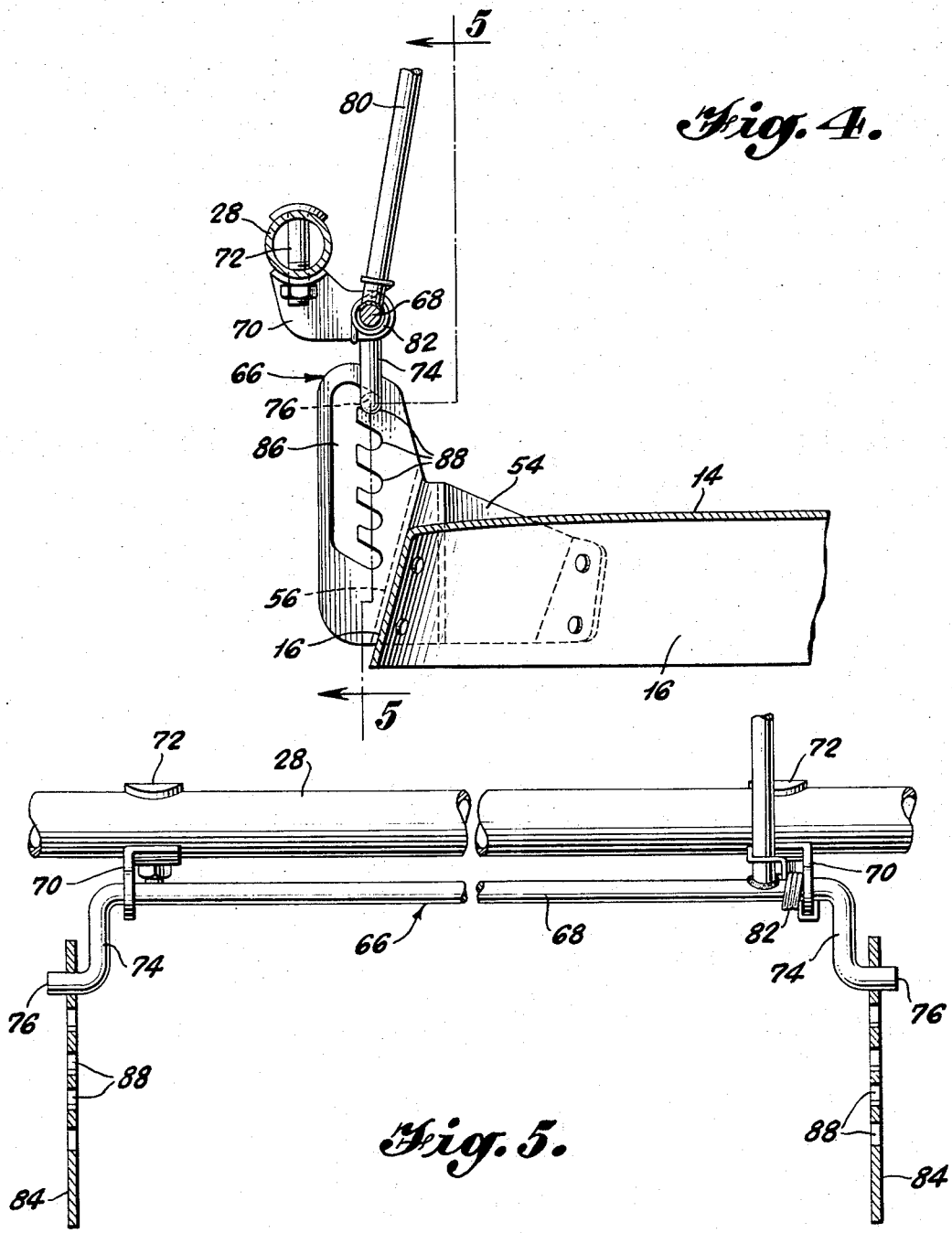

United States Patent Office 3,292,351
Patented Dec. 20, 1966

3,292,351
LAWN MOWER HEIGHT ADJUSTING APPARATUS
Walter J. Larson and Harold D. Cook, Des Moines, Iowa, assignors to American Machine & Foundry Company, a corporation of New Jersey
Filed Oct. 14, 1964, Ser. No. 403,712
7 Claims. (Cl. 56—25.4)

This invention relates to vehicular height adjustment mechanisms and more particularly, it concerns wheel mounting arrangements for rotary lawn mowers by which the height of the lawn mower cutting blade or blades relative to the ground may be quickly and easily adjusted.

In rotary lawn mowers, which have been exceptionally popular during recent years, a horizontally disposed cutting blade or disc is carried within a downwardly opening body and rotatably driven about a vertical axis by suitable power means such as an internal combustion engine or an electric motor. The body or housing is in turn carried by wheels, usually four in number, journaled on axles suitably fixed to the body. A handle is provided for control by a walking attendant or, in some more elaborate machines, a seat together with steering and propelling means are provided.

To enable the height of the blades to be adjusted, two basic arrangements have been employed in rotary lawn mowers heretofore available. In one of these arrangements, the axial position of the blade on its supporting drive shaft is made adjustable by using shims or other suitable means. In the other of the two basic arrangements referred to, the height of the cutting blade is adjusted by repositioning the wheels vertically with respect to the body or housing in which the blade is carried. Although both of these approaches have perhaps been satisfactory from the standpoint of achieving the desired adjustability of cutting blade height, commercially available embodiments of both basic arrangements have left something to be desired with respect to the ease by which the height adjustment operation is carried out. For example, where the height adjustment is effected by arranging a plurality of shims differently on the supporting drive shaft to alter the position of the blade on the shaft, the entire shaft assembly must be first disassembled and then reassembled with the shims located as desired. This arrangement is not only cumbersome to the average lawn mower operator but also it presents, to some extent, a safety hazzard because of the necessity for exposure to the cutting blade.

Although earlier models of lawn mowers provided with adjustable wheel mounts to effect blade height adjustment usually involved a plurality of vertically spaced holes through which bolts could be inserted to secure each of the wheel axle assemblies at the desired vertical position on the lawn mower body or housing, many refinements of this basic arrangement have become available commercially and by which the height of the lawn mower may be adjusted by manipulating a simple latch mechanism associated with each wheel. Nevertheless, these refinements involve independent adjustments of each wheel and the problem of properly adjusting each of the wheels independently requires a burdensome degree of care by persons making the adjustments to assure that all wheels are adjusted evenly. Although this problem may be overcome by arrangements in which all wheels are adjusted simultaneously, mechanisms by which such simultaneous adjustment may be effected have in the past involved such complicated assemblies or have involved such major variations in the basic lawn mower design that this concept has not been fully exploited commercially.

In accordance with the present invention, the entire cutting assembly of the lawn mower for example, i.e., the body, the cutting blade and the engine, is supported centrally from a pivotal frame assembly to which the wheels are attached. The front wheels, for example, are connected directly to the front end of the pivotal frame whereas the rear wheels are connected through linkage to the other end of the frame so as to move in a direction opposite from movement of the other end upon pivotal movement of the frame. Thus, simple pivotal movement of the frame in one direction will effect simultaneous downward movement of both the front and rear wheels with respect to the lawn mower body whereas pivotal movement of the frame in the other direction will effect upward movement of all four wheels simultaneously with respect to the body and thus a lowering of the lawn cutting blade relative to the ground. A latch mechanism is provided by which the pivotal action of the frame may be simply adjusted and yet retained positively in each of its adjusted positions.

A principal object of this invention is therefore, the provision of a new and unique height adjustment mechanism by which the body of a vehicle, such as for example a rotary lawn mower, can be adjusted vertically relative to its wheels to position the body at a desired height above the ground.

A further object of this invention is the provision of a height adjusting mechanism, particularly for rotary type lawn mowers, which may be economically produced and yet capable of providing long-lasting and dependable service by virtue of its rugged simplicity.

Another object of this invention is the provision of a vehicular height adjustment mechanism of the type referred to which is simply operated by way of a single control element in such a manner that the direction of force applied to the control element during adjustment is in the direction of vehicular body movement relative to the wheels and whereby the magnitude of force required to make the adjustment is reduced by a mechanical advantage inherent in the mechanism.

Another object of this invention is to provide a height adjustment mechanism and support for a lawn mower body, for example, by which load stresses are transmitted to members particularly capable of resisting such stresses, thereby enabling a light-weight and yet strong over-all assembly.

A further object of this invention is to provide a new and unique rotary lawn mower having an extremely effective height adjustment facility by which the height of the cutting blade may be simply and quickly adjusted from a single control point.

Still another object of this invention is the provision of a rotary lawn mower of the type referred to in which the engine and body portion of the lawn mower is suspended from a frame mechanism for adjustably mounting the wheels of the lawn mower in such a manner that impact and vibration forces applied to the wheels during travel over the ground are not to any great extent transmitted to the lawn mower body and associated components.

Still other objects and further scope of applicability of the present invention will become apparent from the following detailed description taken in conjunction with the accompanying drawings in which:

FIG. 2 is a fragmentary side elevation of the lawn mower illustrated in FIG. 1;

FIG. 3 is a schematic view showing solid line representations of the elements of the height adjustment mechanism of this invention in one position and, in phantom lines, these elements in another position;

FIG. 4 is an enlarged fragmentary cross-section taken along line 4—4 of FIG. 1; and FIG. 5 is a fragmentary cross-sectional view taken along line 5—5 of FIG. 4.

Figure 1:
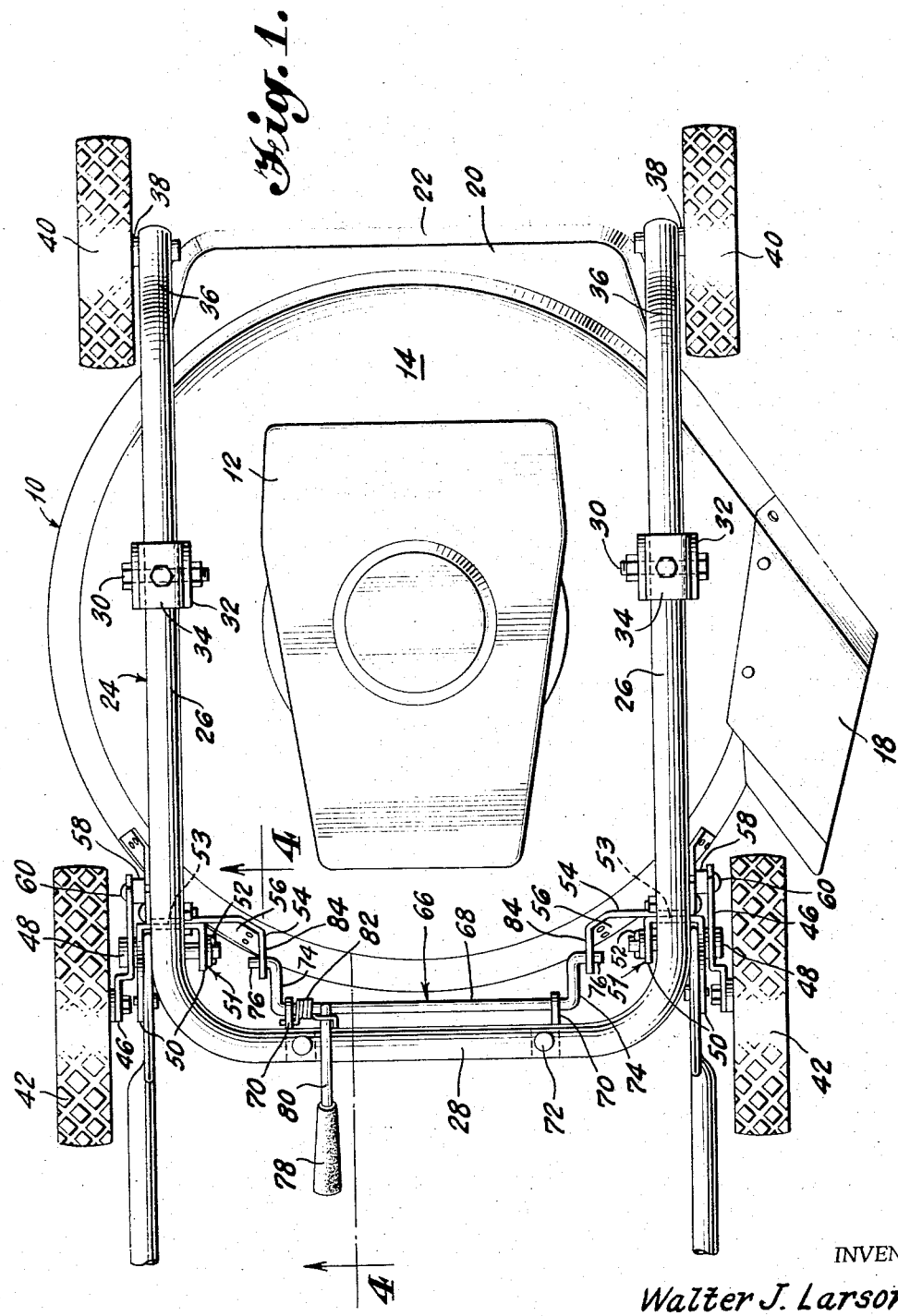
FIG. 1 is a fragmentary plan view of a lawn mower incorporating the height adjustment mechanism of the present invention.

Referring now to the drawings and particularly to FIGS. 1 and 2 thereof, it will be noted that the height adjustment mechanism of the present invention is embodied in a rotary lawn mower generally shown to include a body 10 on which an internal combustion engine 12 is supported. The body 10 is generally circular in shape and may be cast or stamped to provide an upper deck 14 and downwardly extending peripheral skirt portion 16 having a tangential opening to which a discharge chute 18 is affixed. Also, the front portion of the housing is provided with an extension 20 to establish a generally linear front guard portion 22 in the skirt 16. In accordance with conventional practice, a cutting blade or disk (not shown) is mounted on a drive shaft (not shown) extending centrally and downwardly from the internal combustion engine 12. Thus, the cutting blade or disk rotates about a vertical axis in a substantially horizontal plane contained within the skirt 16.

The height adjustment mechanism of the present invention in the embodiment shown in FIGS. 1 and 2 includes a generally U-shaped frame 24 defining a pair of parallel, longitudinally extending struts 26 connected at their rearward ends by a transversely extending member 28. The struts 26 and thus the frame 24 are pivotally connected at their central portions to the body 10 by aligned bolts 30 extending through aligned apertures in upwardly extending tabs 32 suitably secured to the body deck 14 and the legs of inverted U-shaped clip members 34 secured to the struts 26. The front ends of the struts 26 are formed having downwardly canted portions 36 to which outwardly projecting stub axles 38 are secured in any suitable manner for rotatably supporting front wheels 40.

A pair of rear wheels 42 are journaled on stub axles 44 each mounted respectively on one end of a lever 46 having a centrally disposed pivot pin 48. As shown in FIG. 1, each of the pivot pins 48 extend through rearwardly extending, spaced flanges 50 of a handle mounting bracket 51 and is secured in place by suitable means such as a cotter pin 52. The bracket 51 is U-shaped in the plan view of FIG. 1 to define a vertical base wall 53 secured by bolts (not shown) or the like to the rear face of an angle bracket 54. The bracket 54 is of substantially L-shaped configuration in the plan view of FIG. 1 and formed having bevelled portions 56 for direct connection to the skirt 16 of the lawn mower body 10 by rivets, bolts, welding or the like. The other end of each of the levers 46, or those ends facing forwardly in the embodiment shown in FIGS. 1 and 2 are connected to the lower ends of links 58 by pins 60. The upper ends of the links 58 are provided with an offset 62 for connection by pins 64 to each of the struts 26 of the U-shaped frame 24.

The manner in which the described components operate to adjust the height of the body 10 with respect to the wheels 40 and 42, will be most easily understood by reference to FIG. 3 of the drawings. Each of the components described above with respect to FIGS. 1 and 2 are shown in line form in FIG. 3 and specifically, in solid lines for adjustment with respect to one reference line X—X and in phantom lines with respect to another reference line Y—Y. It will be noted that in moving between the two positions illustrated, two points, namely the pivotal axis defined by the bolts 30 and the pivotal axis defined by the pins 48 remain stationary. These are the only points of direct connection between the assembly including the frame 24 and the lawn mower body 10. Thus, it will be appreciated that in practice movement of the elements between the two positions shown in FIG. 3 will effect a variation in height of the body 10 of the lawn mower from the ground by an amount equal to the distance between the reference lines X—X and Y—Y as shown in FIG. 3. It will be noted further that the pivot point defined by the bolts 30 is approximately equidistant on a horizontal reference between the axles 38 on which the front wheels 40 are journaled and the pins 64 by which the links 58 are connected to the struts 26. The significance of this central location of the bolts 30 on the struts 26 is that when the rear ends of the struts 26 are raised upwardly from the position designated by solid lines to the position designated by phantom lines in FIG. 3, the front wheels will be moved downwardly by a given distance or the distance between the reference lines X—X and Y—Y whereas each pin 64 will be moved upwardly by substantially the same distance. Furthermore, since the links 58 connected to the struts 26 by pins 64 are connected to the forward ends of levers 46 by pins 60, the pins 60 will be moved upwardly by the same distance. Because the levers 46 are pivoted at their centers by pins 48, the rearward ends of the levers 46 or the stub axles 48 to which the rear wheels 42 are journaled will move downwardly through a distance equal to the distance through which the pins 60 are raised. It will be appreciated therefore that the levers 46 and links 58 effect a movement reversing assembly so that upward movement of the rear end of the frame 24 will bring about downward movement of the axles 44 and thus of the rear wheels 42 with respect to the lawn mower body 10. Of course, the direct connection of the front wheel axle 38 to the struts 26 effects a direct downward movement of the front wheels by the pivotal action of the frame 24 about the axis of the bolts 30.

To secure the height adjustment mechanism so that the body 10 remains in the desired position relative to the wheels 40 and 42, a latching mechanism is provided and generally designated by the reference numeral 66 in the drawings. The latch mechanism includes a rod 68 supported from the frame 24 by a pair of brackets 70 suitably secured in spaced relation to each other on the transverse member 28, such as by bolts 72. The rod 68 is thus rotatably supported on and retained substantially parallel to the transverse member 28. At the ends of the rod 68 are parallel cranks 74 terminating in outwardly extending pawl members 76. Also, a handle 78 having an L-shaped shank 80 is welded or otherwise suitably secured to the rod 68 preferably at a point adjacent one of the brackets 70 to facilitate the placement of a coil spring 82 for biasing the rod such that the pawl portions 76 are urged forwardly or the rod 68 biased to rotate in a counterclockwise direction as viewed in FIG. 4, for example.

The remaining portion of the latch 66 is formed by tap portions 84 integrally formed on the angle brackets 54. As shown most clearly in FIGS. 4 and 5 of the drawings, each tab portion 84 is formed having an elongated aperture 86, the forward edge of which is notched to provide a series of vertically spaced pawl receiving slots 88. The pawl portions 76 at the ends of the rod 68 are receivable in the slots 88 to secure the transverse frame member 28 against movement with respect to the body 10 and more particularly, against movement with respect to the pin 48 on which the levers 46 are pivoted. Since the transverse member 28 or the rearward portion of the frame 24 will move downwardly under the weight of the body 10 on the wheels, the slots 88 are downwardly and forwardly inclined to effect a self retention of the pawl portions 76 in the slots. Also, it will be noted that the rod 68, pawls 76 and pins 48 are substantially vertically aligned when the pawls 76 are received in the slots 88 to minimize the development of horizontally acting forces in this connection.

In use, the height adjustment mechanism of this invention is operated by grasping the handle 78 and lifting until the pawl portions 76 become disengaged from the slots 88 and ride into the apertures 86 in each of the tabs 84 of the angle brackets. Then, the handle is raised or lowered depending on whether it is desired to raise or lower the body relative to the ground until the desired height is achieved. At that point, the handle is merely released and by virtue of the spring 82, the pawl portions 76 will engage the appropriate ones of the slots 88 to retain the mechanism in the adjusted position selected.

Thus it will be seen that by this invention an extremely effective vehicular height adjustment mechanism is provided by which the foregoing objectives are completely fulfilled. Not only is the mechanism relatively simple from the standpoint of the number of parts required for its operation, but also the parts are arranged to be inherently strong and capable of withstanding the forces incurred in operating vehicles such as lawn mowers. For example, the stresses imposed on the front wheel supports in an average rotary lawn mower are substantial, particularly during turning, since the front wheels are usually caused to be moved transversely or axially thereby imposing a bending moment in the axle shaft and the component on which the axle shaft is mounted. Since in the present invention a relatively heavy tubular frame 24 is employed and to which the front axles are mounted, the strains are in no way transmitted to the lawn mower body portion or housing 10. The manner in which the housing is supported from the frame so that the preponderance of body weight is carried from points substantially centered on the body tends to provide an even distribution of load carrying stresses in the body. Moreover, it will be noted that the load of the body 10 and engine 12 is transmitted evenly to the front and rear wheels by the frame 24 without imposing any substantial stress in the body 10. This latter feature will be recognized readily with respect to the front wheels 40 since they do not contact the body 10. The load distribution to the rear wheels 42, however, is also substantially isolated from the body 10 because of the manner in which the assembly of brackets 51 and 54 function both as a mount for the rear wheels and a part of the latch 66. Because of this dual function substantially all loading forces are resolved in the brackets, the body 10 serving only in a stabilizing capacity. Accordingly much longer life for a given weight of body material can be expected.

Since many modifications of the present invention are possible and since the height adjustment mechanism may be adapted to many other environments than the lawn mower environment described above it is to be distinctly understood that the foregoing description is illustrative only, not limiting, and that the true spirit and scope of the present invention is to be determined by the appended claims.

What is claimed is:

1. Apparatus for adjusting the height of a rotary lawn mower body comprising: frame means adapted to extend longitudinally over substantially the full length of the body, means to connect said frame means to the body for pivotal movement about a generally central transverse axis of said body, a pair of front wheels connected directly to the front end of said frame means, bracket means for connection to the rear end of the body, centrally pivoted lever means on said bracket means and carrying rear wheels on one end thereof, the other ends of said lever means being connected to said frame means toward the rear end thereof whereby pivotal movement of said frame means effects simultaneous movement in the same direction of said front and rear wheels relative to the body, and latch means for adjustably securing the rear end of said frame means in spaced relation to said bracket means.

2. Apparatus for adjusting the height of a rotary lawn mower body comprising: frame means defining a pair of spaced struts, said struts being arranged to extend longitudinally along each side of the body substantially the full length thereof, pivot means for connecting the central portion of each of said struts to the body about a generally central transverse axis thereof, axle means extending laterally from one end of each of said struts, a pair of levers each having a center pivot for connection to opposite sides of the body at points spaced longitudinally from said strut connecting pivot means, said levers each having wheel mounting axles on one end, linkage means connecting the other ends of said levers to each of said struts respectively, the point of connection of said linkage means to said struts being spaced from said strut connecting pivot means by a distance substantially equal to the distance between said pivot means and said wheel axles on said one end of each of said struts, and means for adjustably fixing the pivotal position of said struts relative to the body.

3. The apparatus recited in claim 2 wherein said frame means is U-shaped to define a transverse member connecting said struts, and wherein said means for adjustably fixing the pivotal position of said struts is adapted to extend between said transverse member and the body.

4. A lawn mower comprising in combination: a body carrying a cutting blade for rotation about a vertical axis, and means for adjusting the height of said body above the ground, said means comprising a U-shaped frame defining a pair of forwardly extending struts connected at their rear ends by a transverse member, a wheel mounted on the forward end of each of said struts, means pivotally connecting the central portions of said struts to the upper portion of said body, a pair of brackets connected at opposite sides to the rear end of said body, a pair of levers pivotally connected at their centers to said brackets respectively, a wheel journaled at one end of each of said levers, a link pivotally connected at its lower end to the other end of each of said levers and at its upper end to the rear end of each of said struts, pawl means carried by said transverse frame member, and ratchet means on at least one of said brackets for engagement by said pawl means to adjustably fix the pivotal position of said struts and said levers relative to said body, thereby adjustably positioning said body with respect to said wheels.

5. The apparatus recited in claim 4 in which said pawl means includes a rod extending parallel to and rotatably connected to said transverse frame member, said rod having crank means on each end thereof, and wherein said ratchet means is provided on each of said brackets to receive said crank means respectively.

6. The apparatus recited in claim 5 including a handle extending radially from said rod.

7. A lawn mower comprising in combination: a body to carry a rotatable cutting blade and power means for rotating said blade, and means for adjusting the height of said body above the ground including, a supporting frame extending longitudinally substantially the full length of said body pivotally connected to said body about a generally central transverse axis of said body, wheel means on one end of said frame, bracket means on said body adjacent the other end of said frame, pivotal means supporting further wheel means at one end and connected at its other end to the other end of said frame, pin means connecting said pivotal means to said bracket means, and latch means to support the other end of said frame on said bracket at a point on said bracket directly above said pin means.

References Cited by the Examiner

UNITED STATES PATENTS

| | | | |
|---|---|---|---|
| 1,806,460 | 5/1931 | Hopkins | 280—43.16 |
| 2,198,526 | 4/1940 | Cockburn | 56—25.4 |
| 2,680,339 | 6/1954 | Murphy | 280—43 X |
| 2,848,859 | 8/1958 | Abel | 56—25.4 |
| 3,147,987 | 9/1964 | Rituns | 280—43.17 X |

ABRAHAM G. STONE, *Primary Examiner.*

RUSSELL R. KINSEY, M. C. PAYDEN,

*Assistant Examiners.*